United States Patent

[11] 3,630,739

| [72] | Inventor | Philip Hine |
| | | Stillwater, Minn. |
| [21] | Appl. No. | 821,109 |
| [22] | Filed | May 1, 1969 |
| [45] | Patented | Dec. 28, 1971 |
| [73] | Assignee | Minnesota Mining and Manufacturing Company |

[54] ANTI-HALATION LAYER COMPRISING GELATIN, TETRAVALENT MANGANESE, AND WATER-SOLUBLE POLYMERIC HYDROLYZATE
11 Claims, No Drawings

| [52] | U.S. Cl. | 96/84 |
| [51] | Int. Cl. | G03c 1/84 |
| [50] | Field of Search | 96/84 |

[56] References Cited
UNITED STATES PATENTS

| 3,102,028 | 8/1963 | Minsk | 96/84 |
| 1,957,888 | 5/1934 | Hickman | 96/84 |
| 2,026,964 | 1/1936 | Capstaff | 96/84 |
| 2,143,791 | 1/1939 | Nadeau | 96/84 |

*Primary Examiner*—Norman G. Torchin
*Assistant Examiner*—Edward C. Kimlin
*Attorney*—Kinney, Alexander, Sell, Steldt and Delahunt ABSTRACT: An aqueous, colored, stable liquid containing tetravalent manganese and a water-soluble addition polymer hydrolyzate prepared by the reduction of potassium permanganate in aqueous media containing a water-soluble addition polymer hydrolyzate, and a photosensitive element containing a light-absorbing layer prepared from the liquid.

ANTI-HALATION LAYER COMPRISING GELATIN, TETRAVOLENT MANGANESE, AND WATER-SOLUBLE POLYMERIC HYDROLYZATE

Tetravalent manganese, usually in the form of manganese dioxide, has often been employed as a light-absorbing material and has found utility in the photographic field as a light-absorbing ingredient in light-absorbing antihalation layers of photosensitive elements. Antihalation layers are light-absorbing layers which are employed to absorb light which would otherwise be reflected within a photographic element during exposure of the element to a light image. The popularity of tetravalent manganese in antihalation layers is at least partially attributable to the fact that such layers are highly absorptive of green and blue light, and are readily rendered colorless when contacted with conventional processing solutions.

The tetravalent manganese present in an antihalation layer is desirably homogeneously distributed. Large particles or clumps of manganese dioxide are undesirable. Attempts to provide a uniform distribution of colloidal manganese dioxide in an antihalation layer have involved physically dispersing manganese dioxide in a resin or gelatin, as in U.S. Pat. No. 2,732,305, or have involved in the situ reduction of potassium permanganate with gelatin, polyvinylalcohol, various plant gums, starch ethers and the like to form the desired suspension of manganese dioxide. Illustrative of such attempts is British Pat. No. 1,078,862, wherein potassium permanganate reportedly is reduced to a colloidal suspension of manganese dioxide in an acidic starch ether solution, the starch ether acting both as a reducing agent for the potassium permanganate and as a suspending agent for the resulting manganese dioxide. This colloidal suspension is then combined with a gelatin binder to provide a film-forming coating liquid from which antihalation layers may be prepared.

Such attempts to provide a uniform distribution of manganese dioxide have been attended by certain deficiencies. For example, agglomerates of particles are produced when gelatin is employed as the reducing and suspending agent. Polyvinylalcohol produces suspensions of manganese dioxide which are generally unstable and from which large particles of manganese dioxide often precipitate. The starch ethers employed in the above-cited British Patent, and plant gums (e.g., gum arabic, etc.) tend to inhibit the hardening of gelatin (e.g., by aldehydes) such that an antihalation layer prepared from a gelatin-starch ether-manganese dioxide coating liquid and hardened by conventional aldehyde hardening is easily scratched in normal usage. Because of these deficiencies, the concentration of tetravalent manganese and hence the obtainable tinctorial strength of such colored liquids has been limited. As a result, the preparation of densely colored, thin antihalation layers has been somewhat difficult.

An object of the present invention is to provide a tetravalent manganese-containing, stable, homogeneous liquid which is suitable for use in the preparation of a light-absorbing antihalation layer of a photosensitive element and which does not significantly inhibit the hardening of gelatin.

Another object of the present invention is to provide a photosensitive element having at least one homogeneous, readily hardenable, light-absorbing layer which contains tetravalent manganese.

Yet another object is to provide a method for producing an aqueous tetravalent manganese-containing homogeneous liquid which is stable and which does not significantly inhibit the hardening of gelatin.

According to one aspect of the present invention, a stable, homogeneous liquid containing tetravalent manganese is produced by chemically reducing potassium permanganate in aqueous media containing a water-soluble addition polymer hydrolyzate having recurring units of the formula

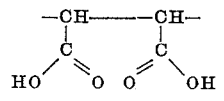

In another aspect the invention relates to an aqueous stable, homogeneous liquid so produced. The liquid comprises, in aqueous media, tetravalent manganese and a water-soluble addition polymer hydrolyzate having recurring units of the formula

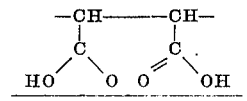

By "tetravalent manganese" as used herein, reference is made to the colored product which results from the chemical reduction of potassium permanganate in which $Mn^{+7}$ is reduced to $Mn^{+4}$. As such, the term "tetravalent manganese" includes manganese dioxide and other $Mn^{+4}$ colored products, as will be more fully described below.

In its preferred embodiment, the method of the present invention may be performed as follows: An aqueous solution of polymer hydrolyzate is prepared by adding a selected polymer such as the copolymer of methyl vinyl ether and meleic anhydride (Gantrez An–139, a trademarked product of General Aniline and Film Corporation) to a volume of water (preferably at least equal proportions by weight) in a suitable container and heating the container until all of the polymer has been hydrolyzed and dissolved. Enough water is employed to yield a clear solution of the polymer hydrolyzate having a concentration of at least about 1.0 percent by weight. To the heated solution is portion wise added a heated aqueous solution of potassium permanganate (preferably above 0.1 percent by weight). As the potassium permanganate solution is added, a brownish color develops, copious quantities of carbon dioxide gas are evolved, and the pH of the resulting liquid begins to rise from an initially low value (e.g., 1.8). The amount of potassium permanganate which is added is controlled so that the pH of the resulting liquid does not exceed about 7.0. Should the pH of the liquid be allowed to exceed about 7.0 by addition of excess potassium permanganate, the polymeric hydrolyzate becomes sufficiently degraded to permit small particles of manganese dioxide to settle out from the liquid.

In the above method, the polymer hydrolyzate itself acts as a reducing agent for the potassium permanganate. The exact nature of the colored tetravalent manganese product which is formed is not completely understood, but it is believed that the $Mn^{+4}$ complexes with the

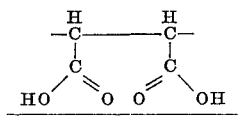

units of the polymer hydrolyzate, or with an oxidation product of the hydrolyzate, and that the formation of this complex is responsible for the excellent stability of the liquids of the present invention.

In another embodiment, the potassium permanganate is reduced by an auxiliary reducing agent which more readily reduces potassium permanganate than does the described polymer hydrolyzate, e.g., a reducing agent which in an aqueous solution more rapidly discharges the purple color of an added dilute aqueous potassium permanganate solution than does an aqueous solution of the polymer hydrolyzate. As in the previously described embodiment, the tetravalent manganese is believed to form a complex with the hydrolyzate. The method may be performed by dissolving in the above-described aqueous polymer hydrolyzate solution a quantity of an auxiliary reducing agent (e.g., manganous sulfate, glucose, oxalic acid, hydroxy carboxylic acids, etc.), raising and maintaining the pH at a value above about four and preferably between five and seven by adding a suitable base (e.g., NaOH) and thereafter portion-wise adding to the solution an aqueous solution of potassium permanganate, preferably in at least sufficient amount to oxidize all of the auxiliary reducing agent. As such, the auxiliary reducing agent acts as the primary reducing agent, although some oxidation of the hydrolyzate may also occur. The oxidation-reduction reaction normally occurs rapidly at room temperature. To avoid any precipitation, the pH of the liquid is normally not allowed to exceed about seven during this reaction, although after the reaction has been completed the pH may, if desired, be raised to values as high as about 10 without significant degradation or precipitation.

The colored liquid of the present invention may contain unusually high concentrations of tetravalent manganese without exhibiting undesirable settling out of manganese dioxide, and hence may exhibit unusually high tinctorial strength.

The polymers which are employed to form the hydrolyzates used in the present invention are the addition polymerization products e.g., copolymers, terpolymers, etc., of ethylenically unsaturated monomers wherein one of the monomers preferably is maleic anhydride. When heated in water, the anhydride groups of such polymers are hydrolyzed to form recurring

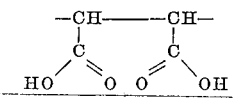

units. It is required for the present invention only that the polymer hydrolyzate be soluble in water. Copolymers of maleic anhydride with, for example, methyl vinyl ether, ethylene, styrene, and vinyl pyrrolidone have given excellent results.

"Polymer Hydrolyzate" as used herein includes not only a single polymer hydrolyzate species, but also a combination of polymer hydrolyzate species, such as, for example, equal quantities by weight of the hydrolyzates of the copolymer of methyl vinyl ether and maleic anhydride and the copolymer of styrene and maleic anhydride, etc.

Light-absorbing layers for photosensitive elements may be prepared from a liquid of the present invention, for example, by first combining the liquid with a film-forming binder to provide a film-forming coating liquid, and coating this liquid onto a photographic substrate to form a colored layer upon drying. Gelatin, or gelatin containing a synthetic polymer gelatin substitute such as polyacrylamide or the like, is preferred as the film-forming binder since layers containing such binders are permeable to common photographic processing solutions. Various wetting agents hardeners and the like may also be included in the film-forming liquid. A tetravalent manganese-containing light-absorbing layer, when employed as an antihalation layer, is preferably positioned as an outer layer of a photographic element so that this layer may be readily contacted with processing solutions during development, the tetravalent manganese being thereby reduced to the colorless divalent form. In a preferred embodiment, a conventional silver halide photographic emulsion is carried on one surface of a transparent base film such as cellulose triacetate, polyethylene terephthalate, etc., and the described antihalation layer is carried on the other surface thereof. In another embodiment, the described antihalation layer is positioned between the silver halide photosensitive layer and the base film. It may in some instances be desirable to position a tetravalent manganese-containing, light-absorbing layer elsewhere in a photosensitive element, for example, between respective photosensitive layers.

The invention may be more fully understood by reference to the following illustrative examples.

EXAMPLE I

Water (90 g.) to which had been added 10 g. of the copolymer of methyl vinyl ether and maleic anhydride ("Gantrez An-139," a trademarked product of General Aniline and Film Corporation) was heated at 140° F. for three hours to provide a clear solution of the polymer hydrolyzate. To this heated solution was portion-wise added over a period of 20 minutes a solution of 8.0 g. of potassium permanganate in 240 ml. of water, preheated to 140° F. During addition of the permanganate solution, a brown color developed in the resulting liquid from the formation of tetravalent manganese, and the pH of the liquid rose from an initial value of 1.8 to a value of 6.0. The brownish liquid was then cooled to 100° F. and combined with a solution of 35 grams of gelatin in 85 ml. water. To the resulting liquid was then added 5 ml. of a 15 percent by weight aqueous saponin solution and sufficient aqueous 3.7 percent formaldehyde solution to provide 1.0 gm. of formaldehyde per 100 gm. of gelatin. This liquid was then coated to a dry thickness of 10 microns on photographically subbed and primed 4.0 ml. polyethylene terephthalate film. An optical density of the colored layer of 1.04 was measured with a Quantascan Densitometer (Quantametric Devices, Inc.) using a Wratten No. 94 blue filter (Eastman Kodak Co.).

At no time during the above process was the tetravalent manganese observed to form visible particles or settle out of the colored liquid.

EXAMPLES II–IV

Example I was repeated except that for the copolymer of methyl vinyl ether and maleic anhydride was substituted the polymers listed below. Each example provided essentially the same results as were obtained in Example I.

| Example | Copolymer |
|---|---|
| II | Copolymer of ethylene and maleic anhydride ("E/MA-840-11," a product of Union Carbide Corporation) |
| III | Copolymer of vinyl pyrrolidone and maleic anhydride ("5681/168," a product of General Aniline and Film Corporation) |
| IV | Copolymer of styrene and maleic anhydride |

EXAMPLE V

The following example compares the scratch resistance (e.g., hardness) of two aldehyde-hardened antihalation layers, one of which utilized the starch ethers of British Pat. No. 1,078,862 and the other of which was prepared according to Example I above.

To 100 ml. of a 12 percent aqueous starch ether solution ("Floc Aid 1063," National Starch and Chemical Company) at 140° F. containing 4.8 ml. of 1.0 N sulfuric acid was added portion-wise over a period of 20 minutes a solution of 8 grams of potassium permanganate in 240 ml. of water, preheated to 140° F. To the resulting brownish liquid was added 35 ml. of gelatin dissolved in 85 ml. of water, 5 ml. of 15 percent aqueous saponin, and enough 3.7 percent aqueous formaldehyde solution to provide 1.0 g. formaldehyde per 100 g. of gelatin, as in Example I. Small agglomerates of what appeared to be manganese dioxide were visually observed in the resulting coating liquid.

The brownish coating liquid was coated onto the surface of the photographically subbed and primed cellulose triacetate film of Example I to the same dry thickness.

Comparative scratch resistance tests were then run on the colored layer prepared in the present example and on the colored layer of Example I by the method reported by J. T. Parker and L. J. Sugden, *Journal of Photographic Science and Engineering*, Vol. 7, No. 1 (Jan.-Feb., 1963), pp. 41–47, giving the following results:

Layer of Example I: 285 grams required to scratch
Layer of Example V: 145 grams required to scratch.

Various modifications of the quantities and concentrations utilized may become apparent without departing from the scope of this invention.

Having described my invention, I claim:

1. A photosensitive element having at least one homogeneous light-absorbing layer comprising gelatin, tetravalent manganese, and a water-soluble addition polymer hydrolyzate having recurring units of the formula

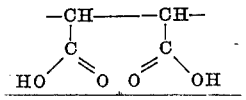

2. The photosensitive element of claim 1 wherein said at least one light-absorbing layer additionally comprises a synthetic polymer gelatin substitute.

3. The photosensitive element of claim 1 wherein said at least one light-absorbing layer is an outer layer of said element.

4. A photosensitive element comprising a transparent base carrying a silver halide photographic emulsion layer on one surface thereof and carrying a colored antihalation layer on the other surface thereof, said antihalation layer comprising gelatin, tetravalent manganese, and a water-soluble addition polymer hydrolyzate having recurring units of the formula

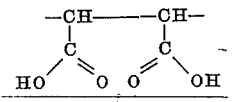

5. A photosensitive element having at least one homogeneous light-absorbing layer comprising gelatin, tetravalent manganese, and a water-soluble hydrolyzate of an addition polymer of an ethylenically unsaturated monomer and maleic anhydride.

6. The photographic element of claim 5 wherein said addition polymer is the copolymer of maleic anhydride and an ethylenically unsaturated monomer selected from the group consisting of methyl vinyl ether, ethylene, styrene, and vinyl pyrrolidone.

7. A photosensitive element having at least one homogeneous light-absorbing layer comprising gelatin, tetravalent manganese, and the hydrolyzate of methyl vinyl ether and maleic anhydride.

8. A photosensitive element having a homogeneous light-absorbing outer layer which comprises gelatin, tetravalent manganese, and a water-soluble hydrolyzate of the addition polymer of maleic anhydride and an ethylenically unsaturated monomer.

9. The photosensitive element of claim 8 wherein said outer light-absorbing layer includes a synthetic polymer gelating substitute.

10. A photosensitive element which includes a light-absorbing layer comprising gelatin, tetravalent manganese, and a water-soluble addition polymer hydrolyzate having recurring units of the formula

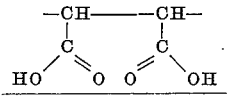

wherein at least a portion of said hydrolyzate is present as the $KMnO_4$ oxidation product thereof.

11. A photosensitive element which includes a light absorbing layer comprising gelatin, tetravalent manganese, a water-soluble addition polymer hydrolyzate having recurring units of the formula

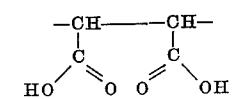

and an oxidized reducing agent, initially capable of reducing $KMnO_4$ more readily than said hydrolyzate.

* * * * *